United States Patent [19]

Krycki

[11] Patent Number: 6,059,554

[45] Date of Patent: May 9, 2000

[54] ADJUSTABLE BUBBLE GUIDE OR CAGE

[75] Inventor: Robert D. Krycki, Brampton, Canada

[73] Assignee: K & S Future Design, Inc., Ontario, Canada

[21] Appl. No.: 09/032,582

[22] Filed: Feb. 27, 1998

[51] Int. Cl.[7] .................................................. B29C 47/90
[52] U.S. Cl. ..................... 425/72.1; 425/326.1; 425/377; 425/392
[58] Field of Search ............................... 425/72.1, 326.1, 425/392, 387.1, 377

[56] References Cited

U.S. PATENT DOCUMENTS

| | | | |
|---|---|---|---|
| 3,749,540 | 7/1973 | Upmeier | 425/72.1 |
| 3,980,418 | 9/1976 | Schott, Jr. | 425/72.1 |
| 4,355,966 | 10/1982 | Sweeney et al. | 425/72.1 |
| 4,453,907 | 6/1984 | Taguchi | 425/72.1 |
| 4,650,407 | 3/1987 | Taguchi | 425/72.1 |

*Primary Examiner*—Harold Pyon
*Assistant Examiner*—Joseph Leyson
*Attorney, Agent, or Firm*—Chupa & Alberti, P.C.

[57] ABSTRACT

A bubble guide unit according to the present invention comprises two concentric frames, at least one of which rotates relative to the other, through which the film bubble passes. At least four bubble guiding rods are arranged symmetrically to each pivotally engage one frame at one end and to freely engage the other frame near its other end. Freely engage here means that the other end of each rod is free to pivot to some extent as well as to move in the direction of its length beyond the pivoting point and back. This is most easily accomplished by a pivoting ring through which the rod passes or, less elegantly, by a fixed ring having an aperture larger than the rod diameter.

4 Claims, 3 Drawing Sheets

ADJUSTABLE BUBBLE GUIDE OR CAGE

BACKGROUND OF THE INVENTION

1. Field of the Invention

The present invention relates to the plastics industry in general and in particular to apparatus for extruding blown film. More particularly, it relates to post extrusion devices generally known as bubble cages or guides.

2. Related Art

All blown film is extruded either vertically, up or down, or horizontally. In all instances, once the polymer exits the cylindrical die, it forms a cylindrical "bubble" and is drawn from the die by means of two rollers (usually known as "nip rollers") which contact a collapsed outer end of the bubble. The distance between the die surface and the nip rollers may vary from six to over one hundred feet. As it exits the die, the bubble is inflated with air to the desired diameter. Normally, the air inflates the bubble through the die and once the requisite diameter has been reached inflation ceases and the air is trapped between the face of the die and the nip roller.

The bubble must be guided to ensure good centering and tracking with minimum side-to-side oscillation or off-centre movement. The guiding has been accomplished by means of bubble cages; individual guiding bars; guiding bars interconnected by means of chains, gears and the like; and a variety of other methods.

SUMMARY OF THE INVENTION

The present invention provides a simple, adjustable bubble guide or cage (hereafter guide).

A bubble guide unit according to the present invention comprises two concentric frames, at least one of which rotates relative to the other, through which the film bubble passes. At least four bubble guiding rods are arranged symmetrically about the center of rotation to pivotally engage one frame at one end and to have its other end portion freely engage the other frame. "Freely engage" here means that the other end of each rod is free to pivot to some extent as well as to move in the direction of its length beyond the pivoting point and back. This is most easily accomplished by a pivoting ring through which the rod passes or, less elegantly, by a fixed ring having an aperture larger than the rod diameter. When one of the two concentric frames is rotated relative to the other, the opening defined by the rods will change its area, and can be adjusted to fit the size of the bubble.

More specifically, a bubble guide unit in accordance with the invention comprises:

- a first hollow frame carrying a number of primary pivot means at locations spaced around a center of the frame, said number being at least four;
- a second hollow frame carrying the same number of secondary pivot means also at locations spaced around a center of the second frame, said second frame being mounted for rotation about an axis passing through both said centers, a series of rods each having one end portion located by a primary pivot means and having an opposite end portion located by a secondary pivot means such that each rod extends across a major portion of the frames, all said pivot means allowing pivotal movement of the rods relative to the frames and at least one of the pivot means of each rod allowing sliding motion of the rod relative to the respective frame, whereby said rods define an opening through which a bubble may pass, and whereby the dimensions of said opening may be altered by rotation of the second frame relative to the first frame.

Preferably, the primary pivot means are located at corners of a first square, and the secondary pivot means are located at the corners of a second square. The first and second frames are preferably in the form of concentric rings.

Such bubble guide units may be stacked vertically or horizontally and their rotating frames interconnected to allow for a single adjustment mechanism. In this case posts connecting corresponding parts of the frames will provide the pivot means holding the rods.

BRIEF DESCRIPTION OF THE DRAWINGS

The preferred embodiment of the present invention will now he described in conjunction with the annexed drawing figures, in which.

DETAILED DESCRIPTION OF THE PREFERRED EMBODIMENTS

Figure 1:
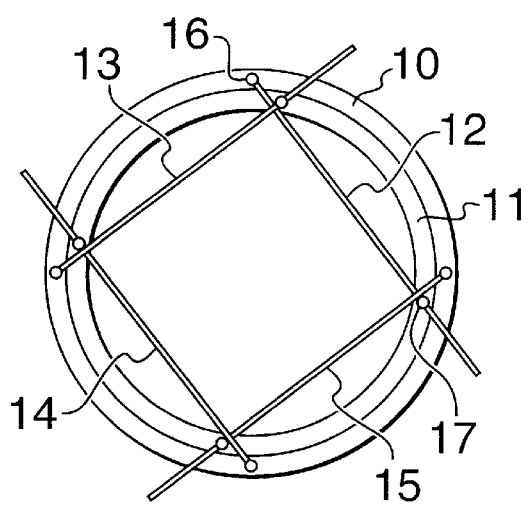
FIG. 1 is diagrammatic a plan view of a guide unit according to the present invention in its maximum diameter position.
Figure 2:
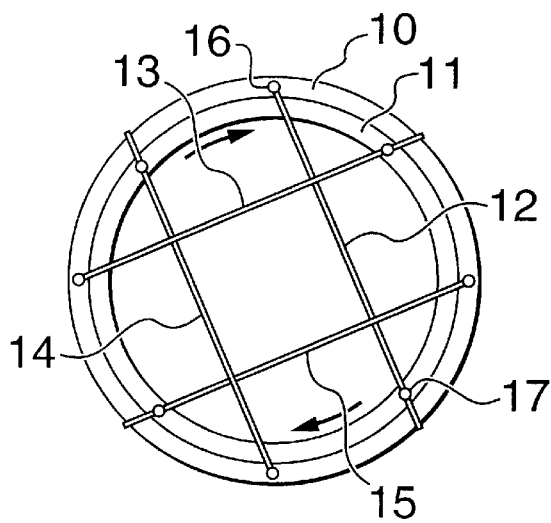
FIG. 2 shows the unit of FIG. 1 but in the ½-diameter position.
Figure 3:
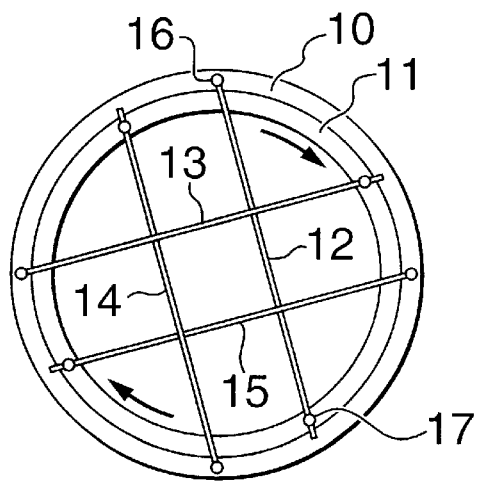
FIG. 3 shows the unit of FIG. 1 but in the ¼-diameter position.
Figure 4:
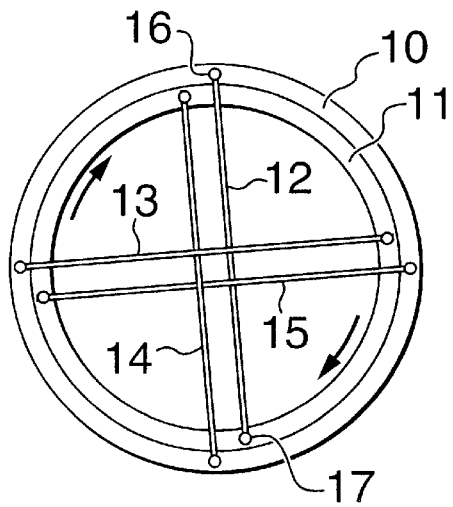
FIG. 4 shows the unit of FIG. 1 but in its minimum diameter position.

Referring now to FIG. 1 the bubble guide unit comprises two concentric ring-frames, i.e. a stationary outer frame 10 and an inner frame 11 rotatable about its center. Four guide rods are shown diagrammatically as lines 12, 13, 14 and 15. The rod 12 is attached at one end to a primary pivot 16 anchored to the outer ring 10, while its other end portion is slidably attached, near its end, to a secondary pivot 17 anchored to the inner ring 11. The other rods 13, 14 and 15 are similarly attached at one end to a primary pivot on the outer frame and slidably attached near the other end to a secondary pivot on the inner frame. The rods 12, 13, 14 and 15 must be of sufficient length so as not retract out of the pivot 17 when the inner frame 11 is rotated to the condition of FIG. 4 where the opening between the rods is at a minimum size.

Figure 5:
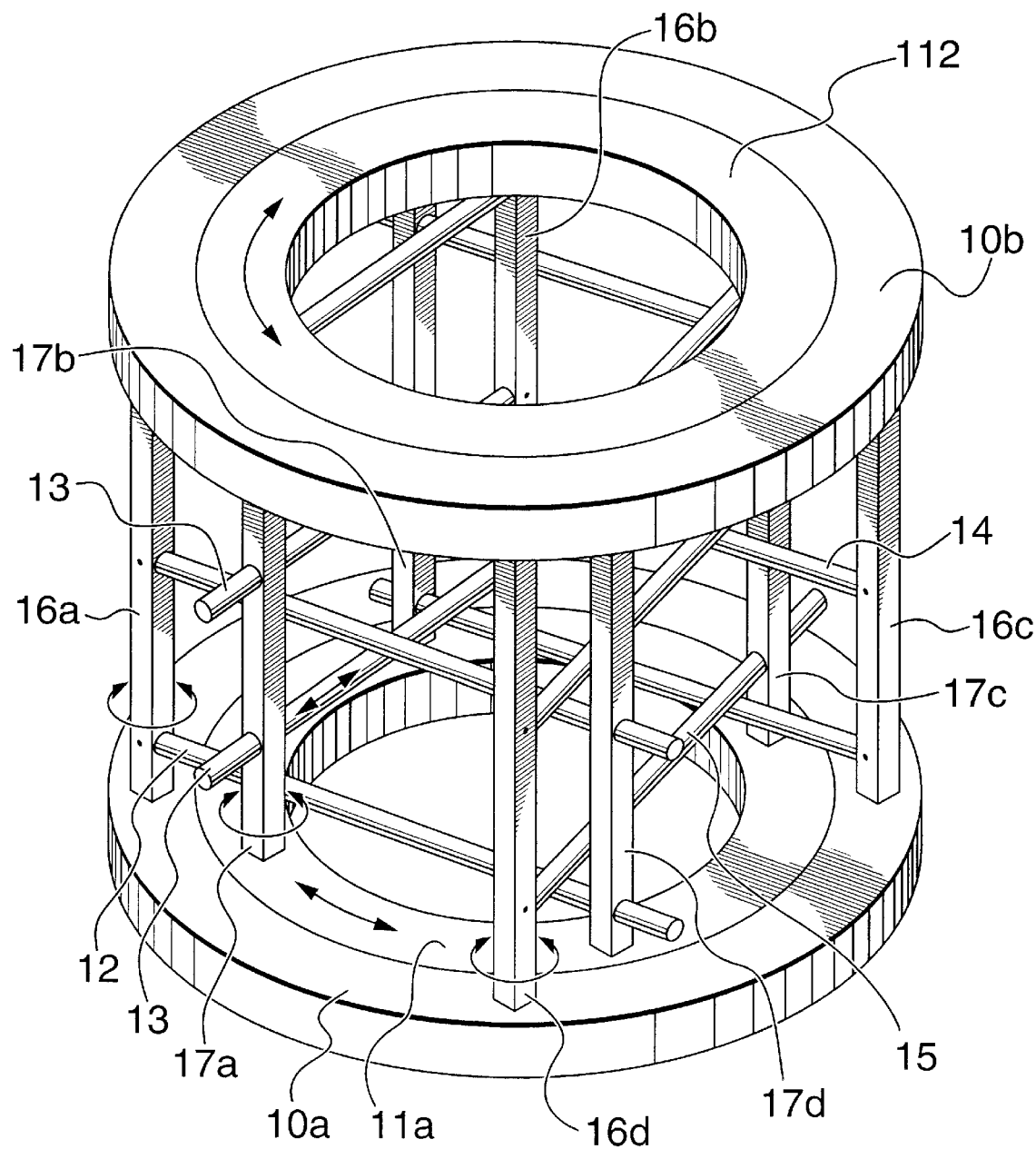
FIG. 5 shows a unit of the bubble guide construction in perspective.
Figure 6A:
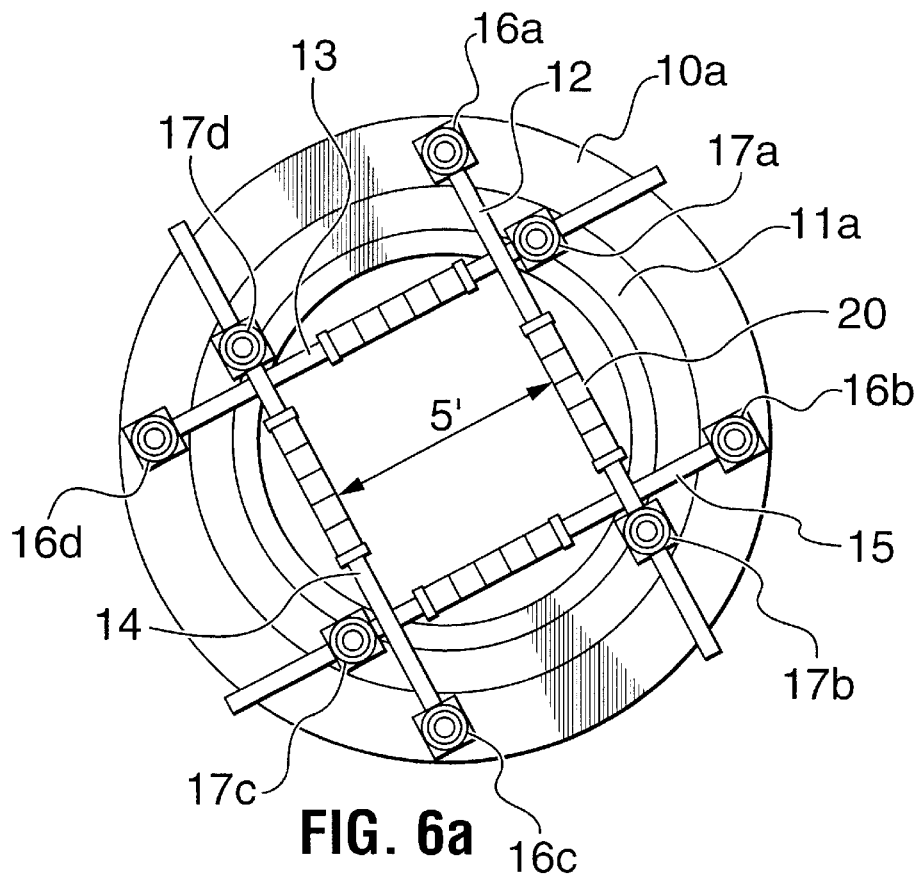
FIGS. 6a and 6b show cross-sectional views through the center of the unit of FIG. 5 in its maximum and minimum positions, respectively.
Figure 6B:
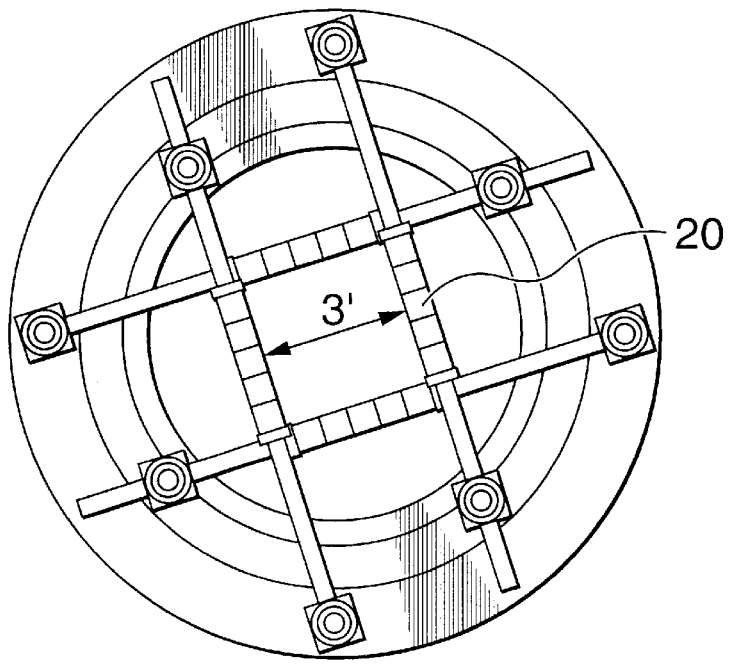

Referring now to FIGS. 5, 6a and 6b of the drawings, the preferred embodiment is described. It is generally critical in the blown film process to keep the film tube aligned with the top nip rollers and the blown film die. The blown film process is normally an upward extrusion. However, downward extrusion has been used in the past.

As may be seen, the bubble guide is constructed with two lower and two upper frames in the form of outer and inner lower rings 10a, 11a, and outer and inner upper rings 10b, 11b, with a hole in the centre of the each inner ring. The outer rings 10a and 10b are connected by four equally spaced outer vertical posts 16a, 16b, 16c, 16d, and the inner rings 11a, 11b are connected by four equally spaced inner vertical posts 17a, 17b, 17c, 17d. The lower outer and inner rings 10a and 11a act like inner and outer portions of a hearing, where the outer ring remains stationary, the inner ring being the race of the bearing that is able to rotate. The outer ring 10a holds the posts 16a, etc. in such manner that they can rotate around their longitudinal axes, and inner ring holds the posts 17a, etc. in the same manner, so that the posts 16a, etc. constitute primary pivots and the posts 17a, etc. constitute secondary pivots. The lower rings and the upper rings are a mirror image of each other. In the example shown, there are four posts on the outer ring and fouur posts on the inner ring, each set of posts being located as at corners of a square. The outer posts 16a, etc. have been drilled adjacent their lower and upper ends so that each post accepts round rods 12, 13, 14, and 15, that have been fixed with a setscrew, adjacent their lower and upper ends. The four posts 17a, etc. on the inner rings have been drilled through adjacent their lower and upper ends, to allow the mating rods to slide freely as required. The rods are arranged in groups of lower and upper rods adjacent to the lower and upper rings respectively, and the distances of the rods from the rings are staggered vertically so that there is no interference between rods. The construction operates as follows:

With the outer rings 10a, 11a, held stationary, and with the four posts 16a, etc. with the rods 12, etc. having enough length to pass through the inner posts 17a, etc. at the same level when the inner rings are rotated the rods will move inwards or outwards symmetrically. The varying size of the square opening defined by the rods 12, etc. is allowed for by the rods sliding through the inner posts 17a, etc. Therefore all four posts rotating on the inner rings 10a, 10b will collectively move the sets of four lower and four upper rods together thereby reducing the size of the openings.

To reduce friction between the rods 12, etc. and the bubble, the rods may have a covering, and this may be in the form of rollers, either in the form of a single solid roller for each rod, or a series of small rollers, as shown at 20 in FIGS. 6a and 6b, that would rotate on the rods by way of friction with the bubble if enough friction were present.

The term rods as used herein means also rods with any covering used to assist in guiding the blown film, whether it is solid or segmented rollers, ferrous or nonferrous metal, plastic covering such as Teflon™ or an applied slippery agent. It is also possible to have hollow tubes (or tube-like shape) with a series of holes or slots through which air passes to reduce friction or contact with the blown film.

There are no limitations on the number of vertical posts and corresponding rods. However, four, six or eight posts for each pair of lower and upper rings are convenient and will create respectively a square, hexagon or octagon shaped opening; other polygons may also he formed. The rods are only limited in quantity by the space considerations; additional rods would be staggered in distance from the rings. There is naturally a practical limit to the number of rods employed, depending on the ring diameter.

There is no particular height limitation to the apparatus, and if necessary the unit shown may be stacked repeatedly as desired.

What is claimed is:

1. A bubble guide unit comprising: two concentric frames, at least one of which rotates relative to the other, each having upper and lower rings, the upper and lower ring of one frame being rotatable together separately from the upper and lower ring of the other frame through which a blown film bubble can pass; and at least four bubble guiding rods arranged symmetrically to each pivotally engage one frame at one end and to freely engage the other frame near its other end.

2. A bubble guide unit, comprising:

a first hollow frame carrying a number of primary pivot means at locations spaced around a center of the frame, said number being at least four;

a second hollow frame carrying the same number of secondary pivot means also at locations spaced around a center of the second frame, said frames being concentric and each frame including upper and lower rings through which a bubble is guided, the upper and lower ring of one frame being rotatable together separately from the upper and lower ring of the other frame, said second frame being mounted for rotation about an axis passing through both said centers, a series of rods each having one end pxortion located by said primary pivot means and having an opposite end portion located by said secondary pivot means such that the rods extend across a major portion of both frames, all said pivot means allowing pivotal movement of the rods relative to the frames and at least one of the pivot means of each rod allowing sliding motion of the rod relative to the respective frame, whereby said rods define an opening through which said bubble is guided, and wherein the dimensions of said opening are altered by rotation of the second frame relative to the first frame.

3. A bubble guide unit according to claim 2, wherein the primary pivot means are located at corners of a first square, and the secondary pivot means are located at the corners of a second square.

4. A bubble guide unit according to claim 2, wherein said first hollow frame is a lower outer ring connected to an upper outer ring by a series of posts providing said primary pivot means, and said second hollow frame is a lower inner ring connected to an upper inner ring by a series of posts providing said secondary pivot means, said series of rods including a lower group of rods adjacent said lower outer and inner rings and an upper group of rods adjacent said upper outer and inner rings, said upper group of rods defining a second opening above, and corresponding to, that formed by the rods adjacent the lower rings.

\* \* \* \* \*